US012212816B2

(12) United States Patent
Kavuri et al.

(10) Patent No.: US 12,212,816 B2
(45) Date of Patent: Jan. 28, 2025

(54) CONTENT SHARING WITH PLAYBACK CONTROLS TO FACILITATE INDIVIDUALIZED PLAYBACK IN A MULTI-VIEWER SESSION

(71) Applicant: Capital One Services, LLC, McLean, VA (US)

(72) Inventors: Vamsi Kavuri, Glen Allen, VA (US); Mehulkumar Jayantilal Garnara, Glen Allen, VA (US); Jignesh Rangwala, Glen Allen, VA (US); Lee Adcock, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 187 days.

(21) Appl. No.: 17/967,551

(22) Filed: Oct. 17, 2022

(65) Prior Publication Data

US 2024/0129590 A1 Apr. 18, 2024

(51) Int. Cl.
*H04N 21/433* (2011.01)
*H04N 21/236* (2011.01)
*H04N 21/41* (2011.01)
*H04N 21/431* (2011.01)
*H04N 21/4788* (2011.01)

(52) U.S. Cl.
CPC ....... *H04N 21/4788* (2013.01); *H04N 21/236* (2013.01); *H04N 21/4334* (2013.01)

(58) Field of Classification Search
CPC .. H04N 21/4788; H04N 21/236; H04N 7/147; H04N 21/2402; H04N 21/242; H04N 21/6336; H04N 21/64738; H04N 7/15; H04N 21/4147; H04N 21/4583; H04N 21/4666; H04N 21/4334; H04N 21/4532; H04N 21/44224; H04N 21/44008; H04L 12/1827; H04L 12/1831; H04L 43/0841; H04L 43/0864; H04L 65/4015; H04L 65/403; H04L 65/80; H04L 43/0811; H04L 43/0852; H04L 43/10; H04L 65/1089; G11B 27/036; G11B 27/06
See application file for complete search history.

(56) References Cited

U.S. PATENT DOCUMENTS

| | | | |
|---|---|---|---|
| 2014/0007170 A1* | 1/2014 | Klappert | H04N 5/782 725/97 |
| 2021/0250195 A1* | 8/2021 | Baker | H04L 12/1827 |
| 2021/0352359 A1* | 11/2021 | Barvo | H04N 21/2187 |

(Continued)

*Primary Examiner* — Alazar Tilahun
(74) *Attorney, Agent, or Firm* — Foley & Lardner LLP

(57) ABSTRACT

In some embodiments, a system transmits a shared presentation to user devices associated with users. Then, in response to an inquiry from a first user associated with a first viewing device, the system identifies that an answer to this inquiry was covered in a previous portion of the presentation, and generates auxiliary data (e.g., an auxiliary video stream of the shared presentation) corresponding to the previous portion of the presentation. The system then causes the first viewing device to display the auxiliary data corresponding to the previous portion of the presentation, which includes an answer to the first user's inquiry, in lieu of the shared presentation. In an example, the auxiliary data may be played back at a speed that is faster than the default speed of the shared presentation.

20 Claims, 7 Drawing Sheets

(56) References Cited

U.S. PATENT DOCUMENTS

2022/0070011 A1* 3/2022 Frolovichev ........ H04L 67/1396
2023/0262280 A1* 8/2023 Panchaksharaiah .........................
                                                    H04N 21/44204
                                                            725/14

* cited by examiner

CONTENT SHARING WITH PLAYBACK CONTROLS TO FACILITATE INDIVIDUALIZED PLAYBACK IN A MULTI-VIEWER SESSION

BACKGROUND

Participants in a video conference presentation may have questions that have been previously covered in the presentation. Although individual participants can ask questions in real-time that can be answered by the presenter or controlling user (e.g., the participant can either raise their hand to ask their question or type their inquiry into a chat window such that the presenter can provide an answer), existing systems generally are not configured to identify whether that inquiry has already been addressed in a previous portion of the presentation, and provide the participant with the relevant portion for immediate playback in a manner that addresses their inquiry during the presentation without disrupting the flow of the presentation for the other participants.

SUMMARY

Methods and systems are described herein for providing customized playback in content-sharing applications. As one example, methods and systems are described herein for identifying whether an inquiry from a participant has been previously addressed in the presentation and providing the relevant portion of the presentation to the participant for playback, thereby ensuring that the participant's question is answered in real-time without interrupting the presentation.

As discussed, when individual participants ask the presenting user a question that had been previously covered in the presentation, the presenter must reiterate what was previously covered to answer that question or refer the participant to a previous portion of the presentation. Existing systems generally do not enable a previous portion of the presentation that may answer a participant's question to be automatically identified and provided to the participant. For example, in order to answer a participant's question from previously presented material, existing systems typically require the presenter or controlling user to interrupt the flow of the presentation to direct the participant's attention to the relevant previous portion of the presentation.

To overcome these technical issues, methods and systems disclosed herein use natural language processing to automatically identify whether a previous portion of the presentation answers a participant's question, and upon determining that such a portion exists, provides that identified portion to the participant. The participant can play back the identified portion, and then continue with the presentation from when the identified portion was played back. In order to ensure that the participant does not lag too far behind the material being presented by the controlling user, the identified portion may be played back at a faster than normal speed.

For example, in instances where a system or controlling user wants to facilitate providing responses to previously answered inquiries during content sharing with users in a video conference, some embodiments involve: (i) receiving an inquiry from a first viewing user at a first time corresponding to a first timestamp of a primary video stream of a shared presentation, (ii) identifying, based on the inquiry, a previous temporal portion of the primary video stream that corresponds to a response to the inquiry, and (iii) generating a first auxiliary video stream of the shared presentation that corresponds to the previous temporal portion of the primary video stream. In one scenario, the primary video stream of the shared presentation, which is being shared with multiple viewing devices associated with viewing users, is being displayed at each of the viewing devices at a default speed. The system or controlling user can then cause a first viewing device associated with the first viewing user to display the first auxiliary video stream, in lieu of displaying the primary video stream, at a first playback speed. This results in the inquiry posed by the first viewing user to be answered. Then, upon completion of displaying the first auxiliary video stream, the first viewing device may display the primary video stream at a second playback speed from the first timestamp to a real-time position of the primary video stream that is currently being viewed by the viewing users. The system may be configured such that at least one of the first and second playback speeds is faster than the default speed.

As another example, a system may transmit a shared presentation to user devices associated with users such that the shared presentation is displayed at each of the user devices at a default (or regular) playback speed. In response to receiving an inquiry from a first user of the users at a time corresponding to a first timestamp of the shared presentation, the system is configured to identify a previous temporal portion of the shared presentation that corresponds to a response to the inquiry (e.g., using natural language processing to parse both the inquiry and the previous portions of the presentation), and generate instructions, based on identifying, that enable a playback of the previous temporal portion. The system then sends the instructions to a first user device associated with the first user, and the instructions cause the first user device to display the previous temporal portion, in lieu of displaying the shared presentation, at a first playback speed that may be faster than the default speed. Displaying the previous temporal portion to the first user will answer the inquiry that was received from the first user. Finally, and upon receiving an indication from the first user device (e.g., the inquiry was answered, or the user has finished viewing the previous temporal portion), the system can cause the first user device to display the shared presentation at a second playback speed from the first timestamp to a position of the shared presentation that is currently being viewed by the users.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
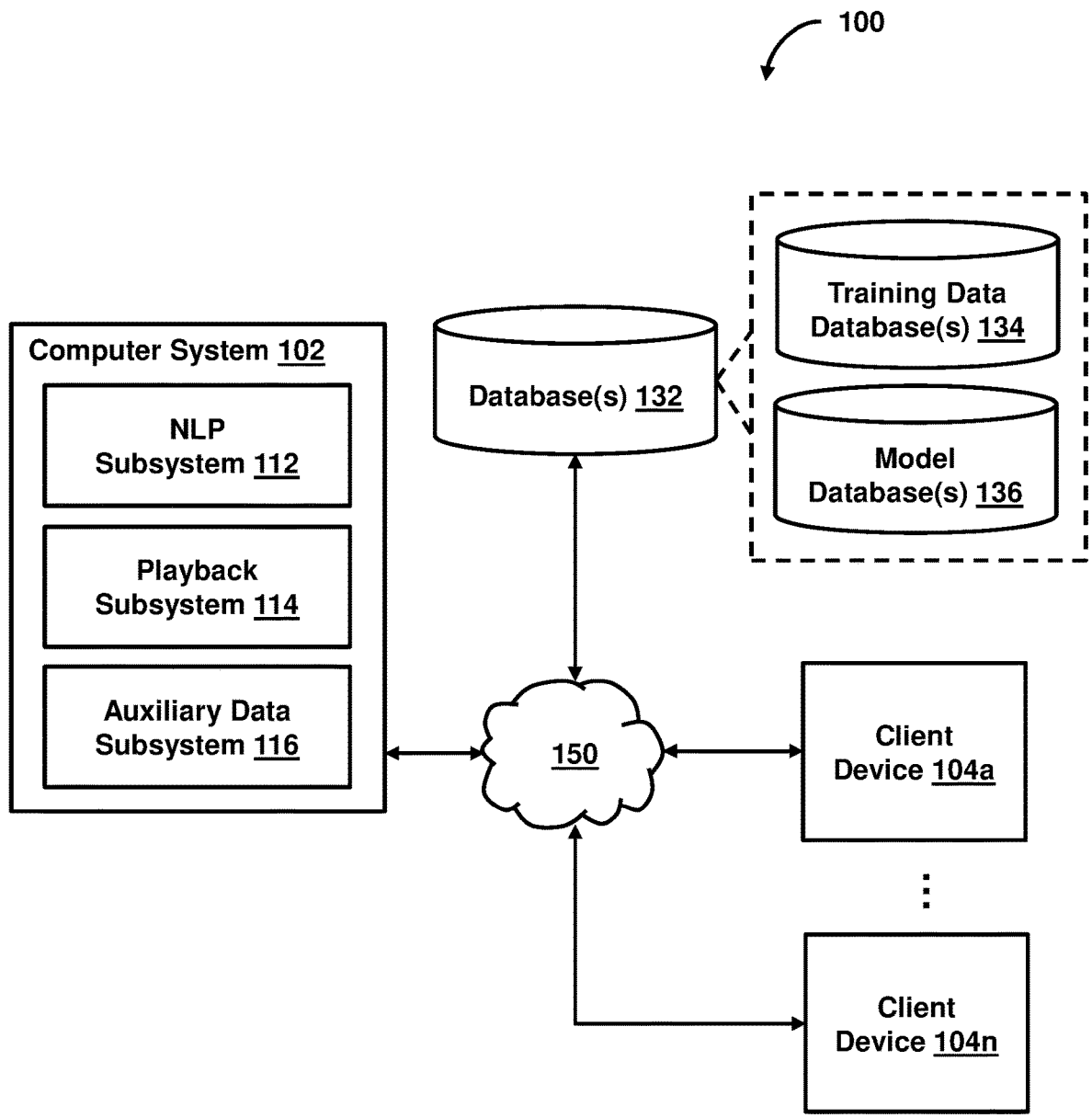
FIG. 1 shows a system for individualized content playback in response to an inquiry in a multi-viewer session, in accordance with one or more embodiments.

FIG. 1 shows a system 100 for providing individualized content playback in response to an inquiry from one or more users in a multi-viewer session, in accordance with one or more embodiments. As shown in FIG. 1, system 100 may include computer system 102, client device 104 (or client devices 104a-104n), or other components. Computer system 102 may include natural language processing (NLP) subsystem 112, playback subsystem 114, auxiliary data subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Figure 2:
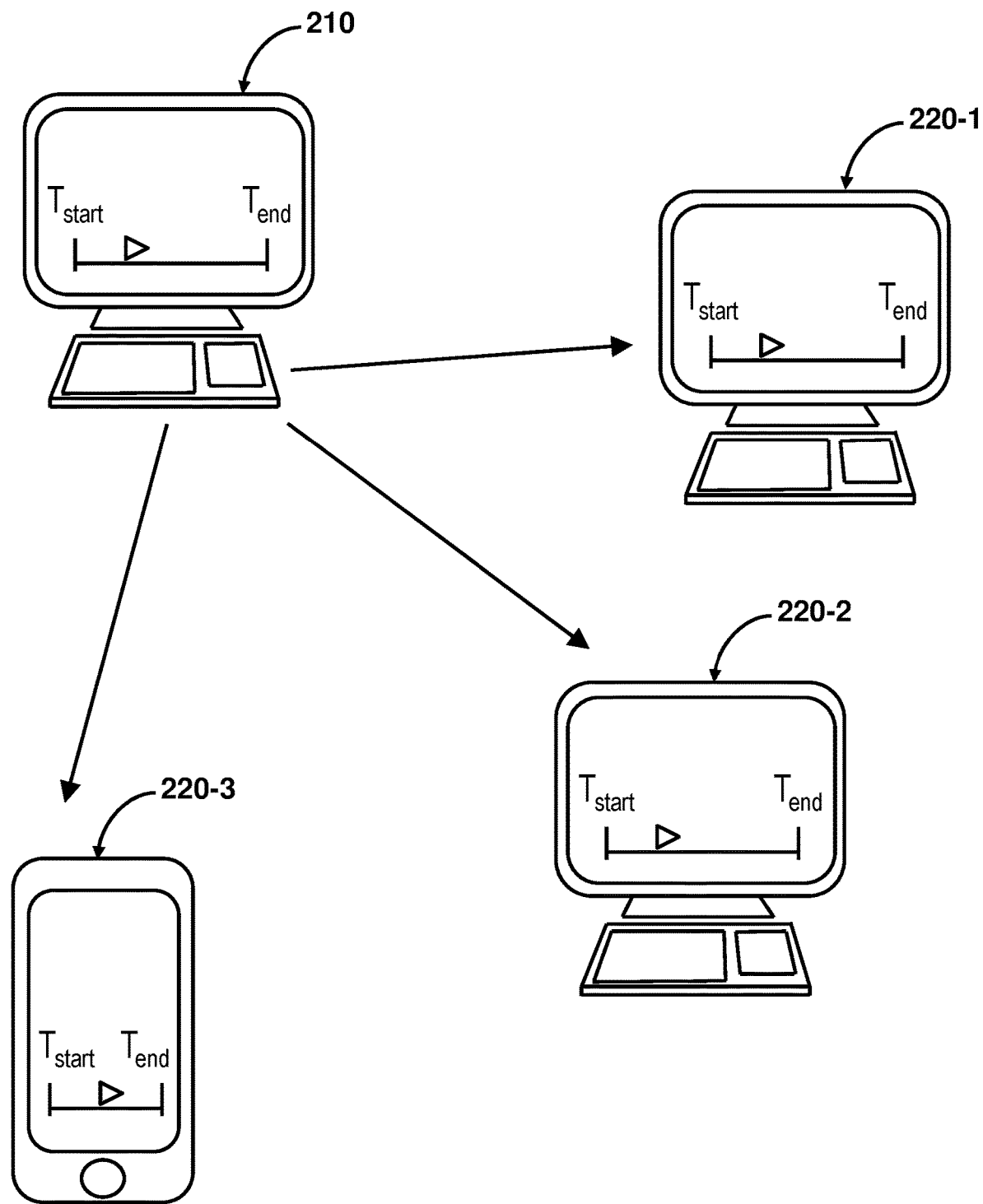
FIG. 2 shows an illustrative diagram of sharing a presentation with multiple viewing users, in accordance with one or more embodiments.

In some embodiments, system 100 includes a presenting user device (e.g., computer system 102) and one or more user devices associated with users (e.g., client devices 104a-104n). In an example, the system 100 transmits the shared presentation to the user devices (alternatively referred to as viewing user devices) via a network (e.g., network 150). In one scenario, with respect to FIG. 2, the presenting user device 210 is displaying a presentation that runs from a start time $T_{start}$ to an end time $T_{end}$. The presentation is transmitted from the presenting user device 210 to the viewing user devices (220-1, 220-2, 220-3). The viewing user devices need not necessarily be of the same type. As seen in FIG. 2, viewing user device 220-3 is a cellphone with a significantly smaller screen than viewing user devices 220-1 and 220-2, which are desktop computers. For example, the scenario in FIG. 2 may correspond to transmitting, during a video conference call, a primary video stream of a shared presentation of a presenting device (210) associated with a presenting user to viewing user devices (220-1, 220-2, 220-3) associated with viewing users such that each of the viewing user devices is caused to display the presentation in real-time, which is synchronous to the presentation on the screen of the controlling user (210).

In some embodiments, a first user associated with a first viewing user device (e.g., 220-1) may have a question or inquiry that was answered in a previous portion of the presentation. If such a previous portion is identified, the system generates auxiliary data (e.g., an auxiliary video stream) that corresponds to the previous portion of the presentation and sends the auxiliary data to the first user so that the first user may watch this portion, in lieu of the (real-time) shared presentation, and answer the question or the inquiry that was posed earlier. In an example, and after watching the previous portion of the presentation, the first user may switch back to watching the shared presentation from the time that the first viewing user device was caused to switch to displaying the previous portion.

Subsystems 112-116

Figure 3:
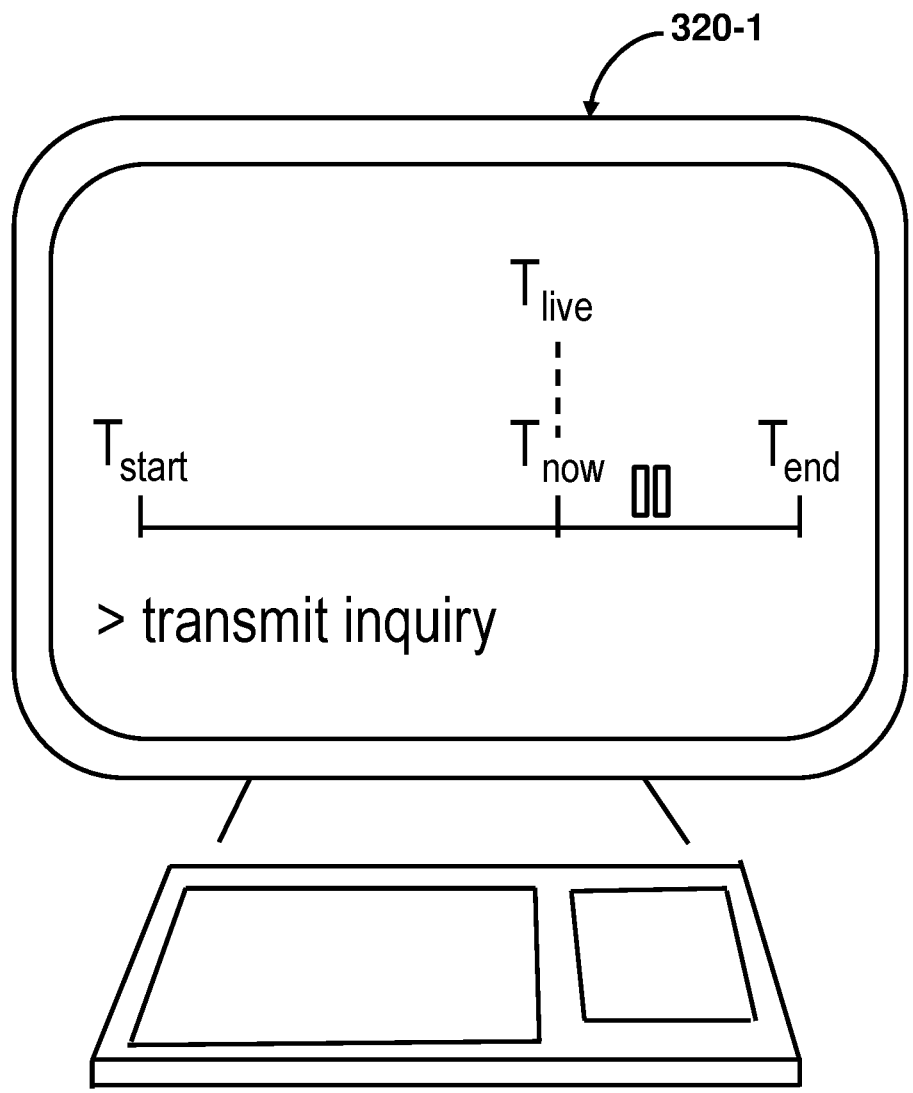
FIG. 3 shows an illustrative diagram of a participant transmitting an inquiry, in accordance with one or more embodiments.

In one scenario, with respect to FIG. 3, the first user associated with the first viewing user device 320-1 transmits an inquiry at a current time $T_{now}$ during the presentation (also denoted $T_{live}$ to indicate that the shared presentation is ongoing or "live"), i.e., between the presentation start time $T_{start}$ and the presentation end time $T_{end}$. In an example, the first user may pause (or stop) the presentation on the first viewing user device in order to transmit the inquiry, whereas in another example, the inquiry may be transmitted while the presentation continues. In yet another example, the first user may transmit the inquiry by using the "Raise hand" function in the video conferencing tool and asking the question, whereas in yet another example, the first user may use the chat window to type in the inquiry, which is the transmitted to the presenter or controlling user.

In some embodiments, natural language processing (NLP) subsystem 112 may be configured to receive and parse the inquiry (e.g., either as a voice snippet or a text snippet) to determine the information therein and context of the inquiry. NLP subsystem 112 may be further configured to parse the presentation, from the start time $T_{start}$ to the current time $T_{now}$, to determine whether the inquiry has been answered in a previous portion of the presentation. In an example, NLP subsystem 112 may be configured to use a natural language processing tool, e.g., Natural Language Toolkit (NLTK), GPT-3 by Open AI, CoreNLP, and/or other existing NLP tools.

Figure 4A:
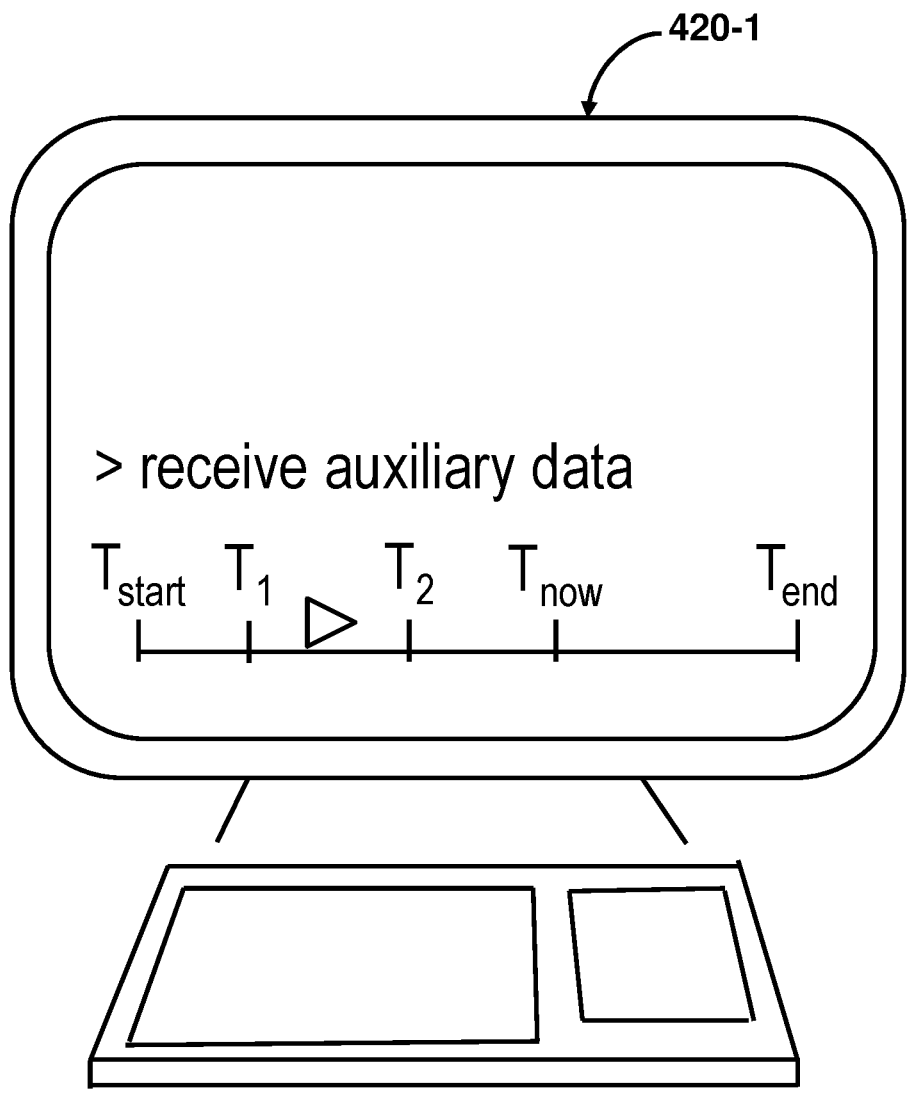
FIG. 4A shows an illustrative diagram of a participant receiving an auxiliary stream for individualized content playback, in accordance with one or more embodiments.

In some embodiments, with respect to FIG. 4A, NLP subsystem 112 identifies a previous portion of the presentation (denoted as being from time $T_1$ to time $T_2$) as being relevant to the inquiry received from the first viewing user associated with the first viewing user device 420-1. In some embodiments, NLP subsystem 112 accesses one or more databases (e.g., database(s) 132 in FIG. 1) and/or NLP processing tools to identify whether a previous portion of the presentation includes the information and context necessary to answer the inquiry transmitted by the first user. In an example, NLP subsystem 112 uses the NLP processing tools to parse the inquiry and generate a structured output (e.g., sequences, trees, and graph data, instead of scalar discrete or real values), and uses the structured output and the shared presentation stream as inputs to a machine learning model, which is trained to identify the previous portion of the presentation that corresponds to the inquiry from the first viewing user.

In some embodiments, the previous portion of the presentation may include a contiguous portion of the shared presentation. In other embodiments, the previous portion may include a first previous temporal portion and a second previous temporal portion that are nonconsecutive (e.g., if the inquiry is related to a concept or idea that was covered in two different instances, or slides, of the presentation up to that point in time).

In another scenario, and continuing with respect to FIG. 4A, auxiliary data subsystem 116 may be configured to generate an auxiliary video stream (or other auxiliary data) that includes the data corresponding to the previous portion of the presentation that was indicated by NLP subsystem 112. As an example, the auxiliary video stream may be generated in the same format (e.g., MPEG® or Matroska®) as the original video stream that corresponded to the shared presentation. This formatting enables the same resources to be used to transmit the auxiliary video stream that were used for the original video stream. As another example, the auxiliary video stream may be generated in a format that is different from the format of the original video stream (e.g., the auxiliary video stream may only include certain types of video content which need not be transmitted in a traditional video format). This formatting enables different, and likely fewer (e.g., if the auxiliary stream can be compressed more), resources to be used to transmit the auxiliary stream. In some embodiments, and upon determining that the first user has configured the first viewing user device to display the auxiliary video stream, the auxiliary video stream may be transmitted (e.g., in lieu of transmitting the entirety of the original video stream). As such, for example, where the auxiliary video stream only includes a portion of the original data, transmitting such portion without transmitting one or more other portions of the original data saves network bandwidth from unnecessarily being used.

In some embodiments, auxiliary subsystem 116 may be configured to transmit decoding instructions to the first viewing user device, which instructs the first viewing user device to only decode the previous portion of the presentation that was identified by NLP subsystem 112 and was buffered at the first viewing user device in an encoded format. In this scenario, an encoded video stream (e.g., encoded using H.264 or H.266) corresponding to the entire shared presentation is transmitted to all viewing user devices, but the user that transmitted an inquiry or question may only decode a portion of that encoded video stream, thereby saving processing resources at the viewing user device (e.g., which may have limited processing or power resources as in the case of a cellphone).

In yet another scenario, and continuing with respect to FIG. 4A, playback subsystem 114 is configured to cause the first viewing user device 420-1 to playback the auxiliary data (e.g., an auxiliary video stream) from time $T_1$ to time $T_2$, which was identified by NLP subsystem 112 as being relevant to the inquiry transmitted by the first user. In an example, playback subsystem 114 configures the first viewing user device to play back the auxiliary video stream at a first playback speed different from the default speed. As an example, the first playback speed may be faster than the default speed (e.g., 1.5× (one and a half times as fast) or 2× (twice as fast) assuming that the default speed is 1×). As another example, the first playback speed may be slower than the default speed. As another example, the first playback speed may be different from a playback speed at which the presentation is being displayed to one or more other users (e.g., that is faster or slower than such playback speed at which the presentation is being displayed to the other users during the same session).

Figure 4B:
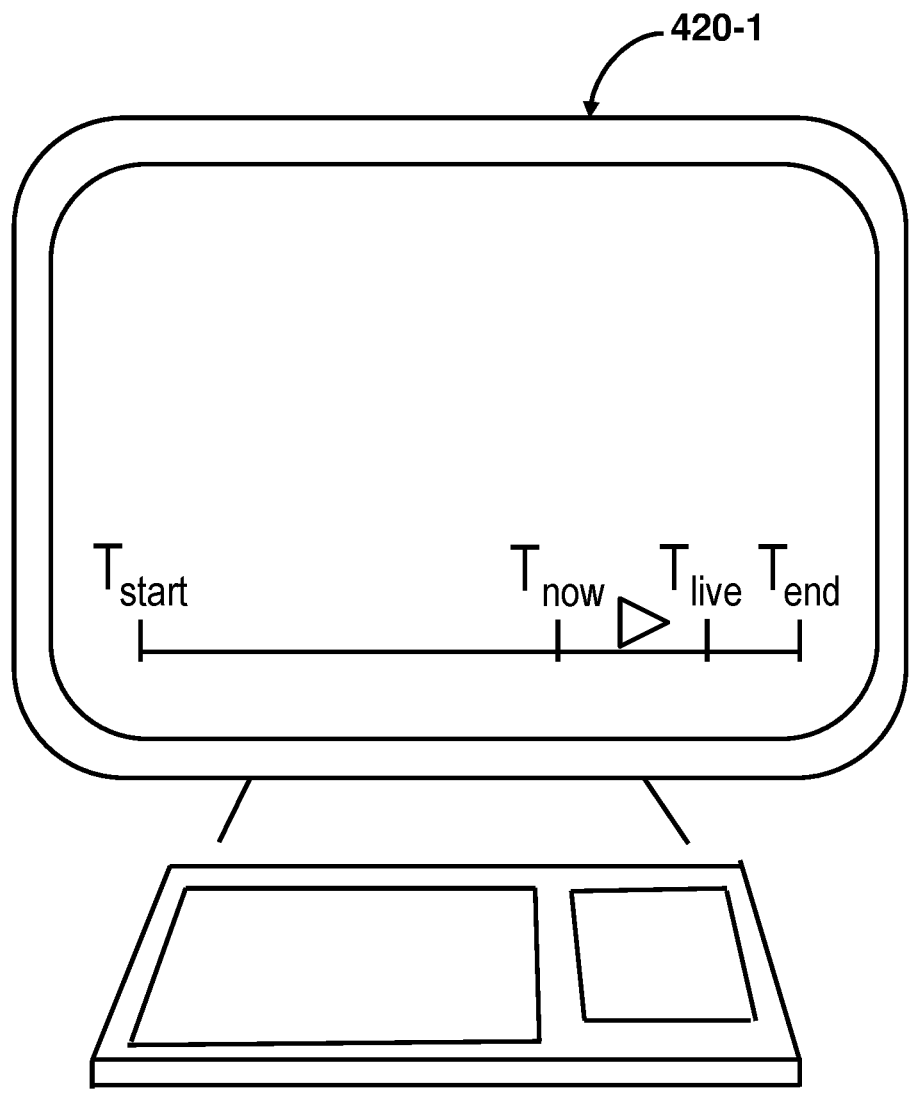
FIG. 4B shows an illustrative diagram of a participant continuing with viewing the presentation, in accordance with one or more embodiments.

In some embodiments, with respect to FIG. 4B, playback subsystem 114 is further configured to resume playback of the shared presentation from the time the shared presentation was stopped (or paused) (e.g., $T_{now}$ as referenced in FIG. 3) by the first viewing user in order to playback the previous portion of the presentation, which contained the answer to the inquiry that had been transmitted by the first viewing user associated with the first viewing user device 420-1. Resuming playback of the shared presentation may start upon the completion or termination of the playback of the previous portion of the presentation (e.g., upon the end of the playback of the previous portion, upon the user terminating the playback of the previous portion, etc.). Alternatively, the playback may be resumed upon receiving an indication from the first user (e.g., if the first user found the answer to their question in the first few moments of the previous portion). In an example, playback subsystem 114 plays the content of the shared presentation from time $T_{now}$ to time $T_{live}$, which is the "live" (or current) time of the presentation at a second playback speed different from the default speed (e.g., that is faster than the default speed, that is slower than the default speed, etc.). As another example, the second playback speed may be different from the first playback speed (e.g., that is faster than the first playback speed, that is slower than the first playback speed, etc.).

In some embodiments, playback subsystem 114 is configured to play back one or both of the previous portion of the presentation (from time $T_1$ to time $T_2$, at a first playback speed) and the resumption of the shared presentation (from time $T_{now}$ to time $T_{live}$, at a second playback speed) at playback speeds that are faster than the default speed. This advantageously ensures that any user that submits an inquiry and receives auxiliary data with the answer has the option of catching up with the live version of the streaming presentation. In an example, the first and second playback speeds can be independently selected by the user. Alternatively, the playback speeds may be automatically set by playback subsystem 114, e.g., the second playback speed may be determined based on the position of the presentation stream that is being viewed by the users and a predetermined end time for the presentation stream (e.g., a scheduled termination of the presentation stream or a predicted end time for the presentation stream). This would typically result in the first user on the first viewing user device (e.g., 220-1) reaching the end of the presentation (e.g., at time $T_{end}$) along with all the other users on their respective viewing user devices (e.g., 220-2, 220-3).

EXAMPLE IMPLEMENTATIONS

Figure 5:
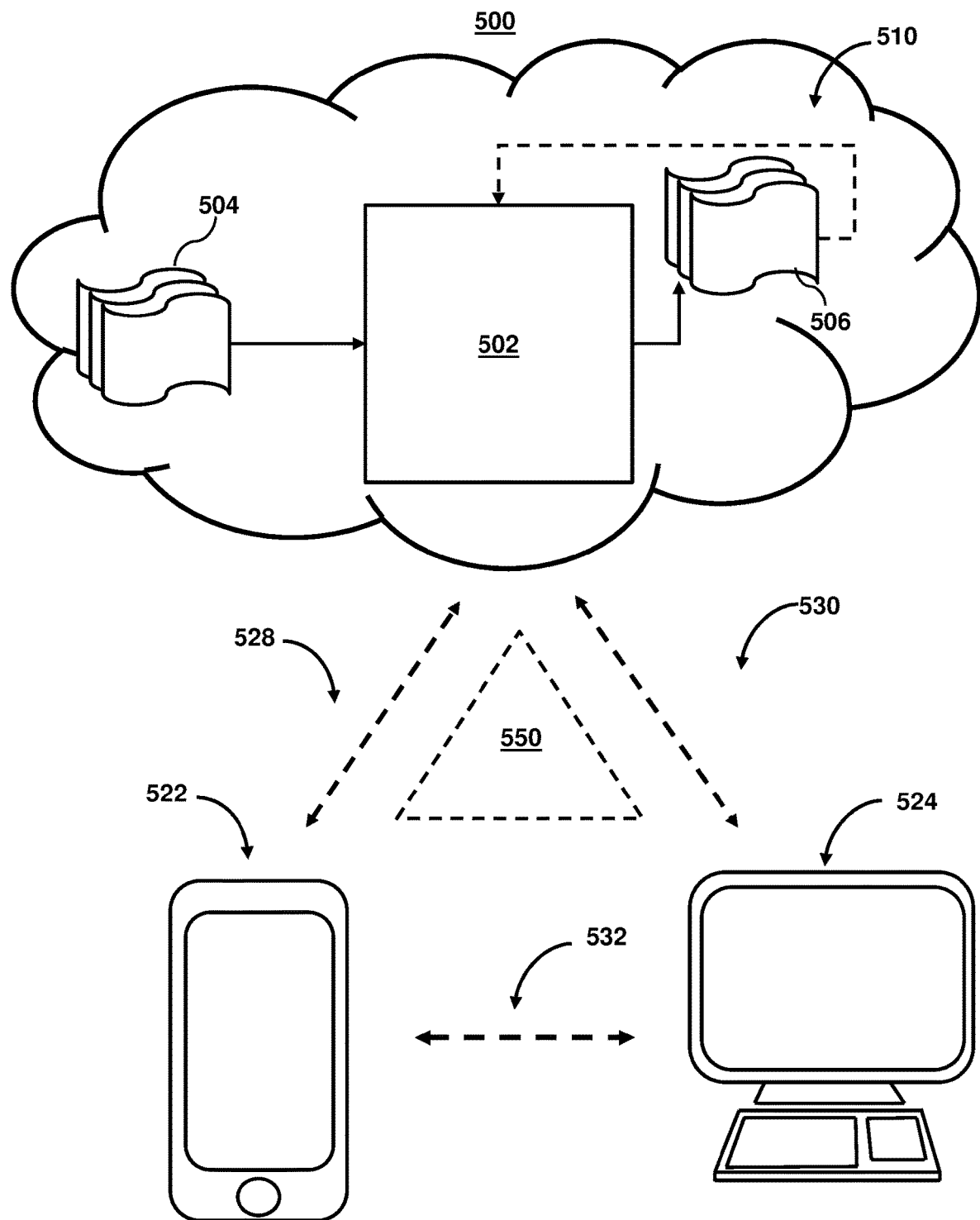
FIG. 5 shows illustrative components for a system used to provide individualized content playback in response to an inquiry in a multi-viewer session, in accordance with one or more embodiments.

FIG. 5 shows illustrative components for a system used to provide individualized content playback in response to an inquiry from one or more users in a multi-viewer session, in accordance with one or more embodiments. As an example, FIG. 5 may show illustrative components for providing one or more students in a classroom with the ability to refer back to a portion of the teacher-presented instruction that answers a specific question the student had asked earlier during the instruction. As another example, FIG. 5 may show illustrative components for a technical presentation to a team, which allows a team member to review earlier portions of the presentation if that team member has a question during a later part of the presentation.

As shown in FIG. 5, system 500 may include mobile device 522 (e.g., viewing user device) and user terminal 524 (e.g., presenting user device). While shown as a smartphone and personal computer, respectively, in FIG. 5, it should be noted that mobile device 522 and user terminal 524 may be any computing device, including, but not limited to, a laptop computer, a tablet computer, a hand-held computer, and other computer equipment (e.g., a server), including "smart," wireless, wearable, and/or mobile devices. FIG. 5 also includes cloud components 510. Cloud components 510 may alternatively be any computing device as described above, and may include any type of mobile terminal, fixed terminal, or other device. For example, cloud components 510 may be implemented as a cloud computing system, and may feature one or more component devices. It should also be noted that system 500 is not limited to three devices. Users may, for instance, utilize one or more devices to interact with one another, one or more servers, or other components of system 500. It should be noted, that, while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 5, both mobile device 522 and user terminal 524 include a display upon which to display data (e.g., conversational response, queries, shared content, and/or notifications).

Additionally, as mobile device 522 and user terminal 524 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, portions of a shared presentation, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 530, and 532. Communication paths 528, 530, and 532 may include the Internet, a mobile phone network, a mobile voice/data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include databases that are accessed and used by model 502, and which include a training data database and a model database. For example, these databases can be accessed by one or more subsystems of the presenting user device.

Cloud components 510 may include model 502, which may be a machine learning model, artificial intelligence model, etc. (which may be referred collectively as "models" herein). Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., how the auxiliary video stream may be generated to optimize the viewing experience for a particular viewing user device).

In some embodiments, the inputs 504 may include the inquiry from a user and/or the shared presentation stream. As an example, the inquiry may be a video or voice snippet (corresponding to the user asking a question in real-time during the shared presentation) or a text snippet (corresponding to the user asking the question through the chat function), and the shared presentation may include both a video stream of the presenter or controlling user and/or a slide deck that is being used for the presentation (or instruction). In some embodiments, the model 502 may use the inputs 504 to determine a previous portion of the presentation that corresponds to the inquiry received in the inputs 504, and transmits this information (as outputs 506) to the presenting user device, e.g., to auxiliary subsystem 116 in the presenting user device. As discussed earlier, auxiliary subsystem 116 can be configured to generate an auxiliary data stream corresponding to the identified previous portion of the presentation, or may generate instructions for either decoding or playing back the identified previous portion.

In the example of a technical presentation to a project team, an inquiry related to a specific part or algorithm may be mapped to a previous portion of the presentation that discusses the corresponding part or algorithm by NLP subsystem 112. Herein, the machine learning model 502 may correlate keywords in the inquiry to both the slide deck and a transcript of the speaker to identify the relevant previous portion of the presentation. Alternatively, or additionally, the inquiry itself may include a request for clarification regarding a certain slide (e.g., indicated by the slide number or title on the slide), which NLP subsystem 112 can use to determine the relevant previous portion of the presentation.

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free-flowing, with connections interacting in a more chaotic and complex fashion. During testing, an output layer of model 502 may indicate whether or not a given input corresponds to a classification of model 502 (e.g., which previous portion of the presentation is selected).

In some embodiments, the model (e.g., model 502) may automatically perform actions based on outputs 506. In some embodiments, the model (e.g., model 502) may not perform any actions. The output of the model (e.g., model 502) may be used to select the previous portion of the presentation that corresponds to the inquiry from a particular viewing user.

System 500 also includes API layer 550. API layer 550 may allow the system to generate summaries across different devices. In some embodiments, API layer 550 may be implemented on mobile device 522 or user terminal 524. Alternatively, or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web-services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open-source API Platforms and their modules. API layer 550 may use a developer portal. API layer 550 may use strong security constraints applying WAF and DDoS protection, and API layer 550 may use RESTful APIs as standard for external integration.

Example Flowcharts

Figure 6:
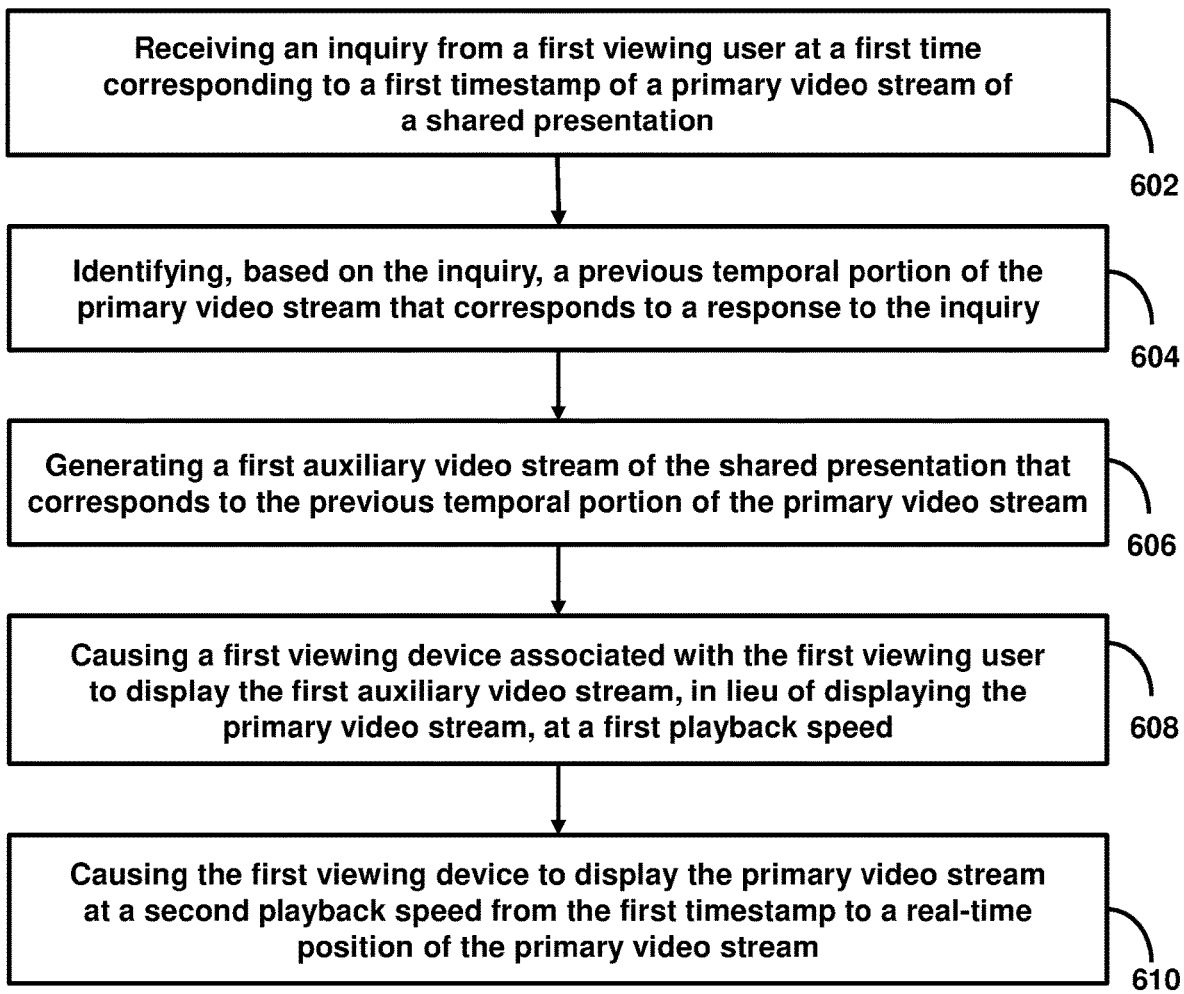
FIG. 6 shows a flowchart of the steps involved in providing individualized content playback in response to an inquiry in a multi-viewer session, in accordance with one or more embodiments.

FIG. 6 shows a flowchart of the steps involved in providing individualized content playback in response to an inquiry from one or more users in a multi-viewer session, in accordance with one or more embodiments. For example, the system may use process 600 (e.g., as implemented on one or more system components described above) in order to ensure that a user that asks a question, which has been answered in a previous portion of the presentation, is presented with that previous portion so that their question may be answered.

At step 602, process 600 (e.g., using one or more components described above) receives an inquiry from a first viewing user at a first time corresponding to a first timestamp of a primary video stream of a shared presentation. According to an exemplary embodiment, the primary video stream of the shared presentation of a presenting device associated with a presenting user may be shared to viewing devices associated with viewing users such that each of the viewing devices is caused to display the primary video stream at a default speed. For example, and with respect to FIG. 3, the first timestamp corresponds to $T_{now}$, corresponding to the time in which the inquiry from the first viewing user (e.g., in the form of a video snippet, an audio snippet, or a text snippet) is received.

At step 604, process 600 (e.g., using one or more components described above) identifies, based on the inquiry, a previous temporal portion of the primary video stream that corresponds to a response to the inquiry. For example, the identification of the previous temporal portion of the primary video stream (or shared presentation) may be performed by an NLP module (e.g., NLP subsystem 112 in FIG. 1). As discussed above, the NLP module operates in conjunction with a machine learning model (e.g., model 502 in FIG. 5) in order to identify the previous temporal portion using the inquiry and the primary video stream as inputs.

At step 606, process 600 (e.g., using one or more components described above) generates a first auxiliary video stream of the shared presentation that corresponds to the previous temporal portion of the primary video stream. In some embodiments, the first auxiliary video stream that corresponds to the previous temporal portion is generated by auxiliary data subsystem 116 in FIG. 1. In other embodiments, auxiliary data subsystem 116 generates instructions that are transmitted to the first viewing user such that the first viewing user device associated with the first user is configured to reconstruct the first auxiliary video stream at the first viewing user device, thereby reducing the bandwidth used to support the individualized content playback.

At step 608, process 600 (e.g., using one or more components described above) causes, during a multimedia or video conference call, a first viewing device associated with the first viewing user to display the first auxiliary video stream, in lieu of displaying the primary video stream, at a first playback speed. In an example, the first playback speed is identical to the default speed. In another example, the first viewing user may watch the entire first auxiliary video stream before switching back to the primary video stream. In yet another example, the first viewing user may terminate the first auxiliary video stream at an intermediate point (e.g., after the inquiry has been answered or clarified) before switching back to the primary video stream. In yet another example, the first playback speed, which may be selected by playback subsystem 114 in FIG. 1, is faster than the default speed at which the primary video stream was originally being played. That is, if the default speed is denoted 1×, then the first playback speed is typically greater than 1× and less than 3× (in which the audio and/or video plays at a rate three times faster than the original default playback speed). In yet another example, the first viewing user may select a first playback speed that is greater than 3×.

In some embodiments, the first viewing user is provided with a complete set of playback controls (e.g., play, stop, pause, fast-forward, rewind, etc.) that can be used when viewing the first auxiliary video stream. In other embodiments, the first auxiliary video stream may be annotated by the first viewing user, and either saved for later reference or shared with other viewing users.

At step 610, process 600 (e.g., using one or more components described above) causes the first viewing device to display the primary video stream at a second playback speed (e.g., that may be equal to or faster than the default speed) from the first timestamp to a real-time position of the primary video stream (e.g., that is being viewed by one or more other users the viewing users). In some embodiments, the second playback speed may be selected by playback subsystem 114 based on an estimate of the duration of the remainder of the shared presentation. For example, the second playback speed can be selected to ensure that the first viewing user is able to view, in real-time, a last portion of the shared presentation. For another example, the second playback speed may be selected based on the contents of the slide deck being used for the presentation and the inquiry that was transmitted by the first viewing user, i.e., if the material being covered between time $T_{now}$ and $T_{live}$ is not related to the inquiry, playback subsystem 114 may select a faster speed for the second playback speed. The determination of whether the material being covered is relevant may be determined by NLP subsystem 112.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above may be used to perform one or more of the steps in FIG. 6.

In some embodiments, the various computers and subsystems illustrated in FIG. 1 may include one or more computing devices that are programmed to perform the functions described herein. The computing devices may include one or more electronic storages (e.g., conversion database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi™, Bluetooth®, near-field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes and is not intended to be limiting, because any of subsystems 112-116 may provide more or less functionality than is described. For example, one or more of subsystems 112-116 may be eliminated, and some or all of its or their functionality may be provided by other subsystems of subsystems 112-116. As another example, additional subsystems may be programmed to perform some or all of the functionality attributed herein to one of subsystems 112-116.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving an inquiry from a first viewing user at a first time corresponding to a first timestamp of a primary video stream of a shared presentation, the primary video stream of the shared presentation of a presenting device associated with a presenting user being shared to viewing devices associated with viewing users such that each of the viewing devices is caused to display the primary video stream at a default speed; identifying, based on the inquiry, a previous temporal portion of the primary video stream that corresponds to a response to the inquiry; generating a first auxiliary video stream of the shared presentation that corresponds to the previous temporal portion of the primary video stream; causing, during a video conference call, a first viewing device associated with the first viewing user to display the first auxiliary video stream, in lieu of displaying the primary video stream, at a first playback speed; and causing, upon a completion of displaying the first auxiliary video stream, the first viewing device to display the primary video stream at a second playback speed from the first timestamp to a real-time position of the primary video stream that is currently being viewed by other users of the viewing users, wherein at least one of the first and second playback speeds is faster than the default speed.

2. A method comprising: transmitting a presentation stream of a shared presentation to user devices associated with users such that each of the user devices is caused to display the presentation stream at a default speed; receiving an inquiry from a first user of the users at a time corresponding to a first timestamp of the presentation stream; identifying, based on the inquiry, a previous temporal portion of the presentation stream that corresponds to a response to the inquiry; generating, based on identifying the previous temporal portion, instructions that enable a playback of the previous temporal portion; causing, based on sending the instructions to a first user device associated with the first user, the first user device to display the previous temporal portion, in lieu of displaying the presentation stream, at a first playback speed; and causing, upon receiving an indication from the first user device, the first user device to display the presentation stream at a second playback speed from the first timestamp to a position of the presentation stream that is being viewed by one or more other users of the users, wherein at least one of the first and second playback speeds is faster than the default speed.

3. The method of the preceding embodiment, wherein the indication comprises a completion of displaying the previous temporal portion at the first playback speed.

4. The method of the preceding embodiment, wherein the indication comprises an input from the first user corresponding to the first user terminating the playback of the previous temporal portion on the first user device.

5. The method of any of the preceding embodiments, wherein the first playback speed is selected by the first user.

6. The method of any of the preceding embodiments, wherein the second playback speed is determined based on the position of the presentation stream that is being viewed by the one or more other users and a predetermined end time for the presentation stream (e.g., a scheduled termination of the presentation stream or a predicted end time for the presentation stream).

7. The method of any of the preceding embodiments, further comprising: using natural language processing to parse the inquiry from the first user and generate a structured output indicative of the inquiry, wherein identifying the previous temporal portion comprises using the structured output and the presentation stream as inputs to a machine learning algorithm.

8. The method of any of the preceding embodiments, wherein the previous temporal portion comprises a first previous temporal portion and a second previous temporal portion that are nonconsecutive.

9. The method of any of the preceding embodiments, further comprising: identifying that a subsequent portion of the presentation stream, which begins at a time corresponding to a second timestamp that is subsequent to the position of the presentation stream that is being viewed by the one or more other users, corresponds to the response to the inquiry; and transmitting, to the first user, information indicative of the subsequent portion of the presentation stream after a termination of the presentation stream.

10. The method of any of the preceding embodiments, further comprising: receiving the inquiry from a second user of the users at a time corresponding to a second timestamp of the presentation stream; causing, based on sending the instructions to a second user device associated with the second user, the second user device to display the previous temporal portion, in lieu of displaying the presentation stream, at a third playback speed that is faster than the default speed.

11. The method of any of the preceding embodiments, wherein the first playback speed and the second playback speed are faster than the default speed.

12. A tangible, non-transitory, machine-readable medium storing instructions that, when executed by a data processing apparatus, cause the data processing apparatus to perform operations comprising those of any of the foregoing method embodiments.

13. A system comprising: one or more processors; and memory storing instructions that, when executed by the processors, cause the processors to effectuate operations comprising those of any of the foregoing method embodiments.

What is claimed is:

1. A system for facilitating providing responses to previously answered inquiries during content sharing with users in a video conference call, the system comprising:
one or more processors programmed with computer program instructions that, when executed, cause operations comprising:
receiving an inquiry from a first viewing user at a first time corresponding to a first timestamp of a primary video stream of a shared presentation, the primary video stream being shared to viewing devices associated with viewing users such that each of the viewing devices is caused to display the primary video stream at a default speed;
determining, using one or more natural language processing models, contextual information associated with the inquiry;
identifying, using the one or more natural language processing models, based on the inquiry, a previous temporal portion of the primary video stream that includes the contextual information to use as a response to the inquiry;
generating a first auxiliary video stream of the shared presentation that corresponds to the previous temporal portion of the primary video stream;
causing, during the video conference call, a first viewing device associated with the first viewing user to display the first auxiliary video stream, in lieu of displaying the primary video stream, at a first playback speed; and
causing, upon a completion of displaying the first auxiliary video stream, the first viewing device to display the primary video stream at a second playback speed from the first timestamp to a real-time position of the primary video stream that is currently being viewed by other users of the viewing users, wherein at least one of the first and second playback speeds is faster than the default speed.

2. A method comprising:
transmitting a presentation stream of a shared presentation to user devices associated with users such that each of the user devices is caused to display the presentation stream at a default speed;
receiving an inquiry from a first user of the users at a time corresponding to a first timestamp of the presentation stream;
identifying, using a machine learning model trained to determine contextual information associated with the inquiry, based on the inquiry, a previous temporal portion of the presentation stream including the contextual information to use as a response to the inquiry;
generating, based on identifying the previous temporal portion, instructions that enable a playback of the previous temporal portion;
causing, based on sending the instructions to a first user device associated with the first user, the first user device to display the previous temporal portion, in lieu of displaying the presentation stream, at a first playback speed;
receiving an indication from the first user device; and
causing, based on the received indication, the first user device to display the presentation stream at a second playback speed from the first timestamp to a position of the presentation stream that is being viewed by one or more other users of the users, wherein at least one of the first and second playback speeds is faster than the default speed.

3. The method of claim 2, wherein the indication comprises a completion of displaying the previous temporal portion at the first playback speed.

4. The method of claim 2, wherein the indication comprises an input from the first user corresponding to the first user terminating the playback of the previous temporal portion on the first user device.

5. The method of claim 2, wherein the first playback speed is selected by the first user.

6. The method of claim 2, wherein the second playback speed is determined based on the position of the presentation stream that is being viewed by the one or more other users and a scheduled termination of the presentation stream.

7. The method of claim 2, wherein the machine learning model comprises a first machine learning model including natural language processing, the method further comprises:
parsing the inquiry from the first user using the natural language processing of the first machine learning model to generate a structured output indicative of the inquiry,
wherein identifying the previous temporal portion comprises using the structured output and the presentation stream as inputs to a second machine learning model to determine the contextual information.

8. The method of claim 2, wherein the previous temporal portion comprises a first previous temporal portion and a second previous temporal portion that are nonconsecutive.

9. The method of claim 2, further comprising:
identifying that a subsequent portion of the presentation stream, which begins at a time corresponding to a second timestamp that is subsequent to the position of the presentation stream that is being viewed by the one or more other users, corresponds to the response to the inquiry; and transmitting, to the first user, information indicative of the subsequent portion of the presentation stream after a termination of the presentation stream.

10. The method of claim 2, further comprising:

receiving the inquiry from a second user of the users at a time corresponding to a second timestamp of the presentation stream; and causing, based on sending the instructions to a second user device associated with the second user, the second user device to display the previous temporal portion, in lieu of displaying the presentation stream, at a third playback speed that is faster than the default speed.

11. One or more non-transitory computer-readable media comprising instructions that, when executed by one or more processors, cause operations comprising:

transmitting a shared presentation to user devices associated with users, the shared presentation being displayed at each of the user devices at a default speed;

identifying, in response to an inquiry from a first user of the users at a time corresponding to a first timestamp of the shared presentation, using a machine learning model trained to determine contextual information associated with the inquiry a previous temporal portion of the shared presentation including the contextual information to use as a response to the inquiry;

generating, based on identifying, instructions that enable a playback of the previous temporal portion;

causing, based on sending the instructions to a first user device associated with the first user, the first user device to display the previous temporal portion, in lieu of displaying the shared presentation, at a first playback speed; and causing, upon receiving an indication from the first user device, the first user device to display the shared presentation at a second playback speed from the first timestamp to a position of the shared presentation that is currently being viewed by one or more other users of the users.

12. The media of claim 11, wherein the indication comprises a completion of displaying the previous temporal portion at the first playback speed.

13. The media of claim 11, wherein the indication comprises an input from the first user corresponding to the first user terminating the playback of the previous temporal portion on the first user device.

14. The media of claim 11, wherein the first playback speed and the second playback speed are faster than the default speed.

15. The media of claim 14, wherein the first playback speed is selected by the first user.

16. The media of claim 15, wherein the second playback speed is determined based on the position of the shared presentation that is being viewed by the one or more other users and a scheduled termination of the shared presentation.

17. The media of claim 11, wherein the machine learning model comprises a first machine learning model including natural language processing, the operations further comprise:

parsing the inquiry from the first user using the natural language processing of the first machine learning model to generate a structured output indicative of the inquiry, wherein identifying the previous temporal portion comprises using the structured output and the shared presentation as inputs to a second machine learning model to determine the contextual information.

18. The media of claim 11, wherein the previous temporal portion comprises a first previous temporal portion and a second previous temporal portion that are nonconsecutive.

19. The media of claim 11, the operations further comprising:

identifying that a subsequent portion of the shared presentation, which begins at a time corresponding to a second timestamp that is subsequent to the position of the shared presentation that is being viewed by the one or more other users, corresponds to the response to the inquiry; and transmitting, to the first user, information indicative of the subsequent portion of the shared presentation after a termination of the shared presentation.

20. The media of claim 11, the operations further comprising:

receiving the inquiry from a second user of the users at a time corresponding to a second timestamp of the shared presentation; and causing, based on sending the instructions to a second user device associated with the second user, the second user device to display the previous temporal portion, in lieu of displaying the shared presentation, at a third playback speed that is faster than the default speed.

* * * * *